(12) United States Patent
Knauerhase et al.

(10) Patent No.: US 6,215,774 B1
(45) Date of Patent: Apr. 10, 2001

(54) SYSTEM FOR DYNAMICALLY DETERMINING EFFECTIVE SPEED OF A COMMUNICATION LINK

(75) Inventors: Robert Conrad Knauerhase, Portland; Michael Man-Hak Tso, Hillsboro, both of OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 08/957,468

(22) Filed: Oct. 24, 1997

Related U.S. Application Data

(60) Provisional application No. 60/042,073, filed on Mar. 25, 1997.

(51) Int. Cl.[7] .................................................. H04J 1/16
(52) U.S. Cl. ............................................ 370/252; 709/203
(58) Field of Search ..................................... 370/250, 252, 370/253, 389, 235, 236, 468; 709/232, 233, 247, 202, 203, 217, 227, 228, 231, 246, 503, 500

(56) References Cited

U.S. PATENT DOCUMENTS

| | | | |
|---|---|---|---|
| 5,235,615 | * 8/1993 | Omura ................................. | 370/342 |
| 5,373,375 | 12/1994 | Weldy .................................. | 358/523 |
| 5,477,531 | * 12/1995 | McKee et al. ....................... | 370/249 |
| 5,517,612 | 5/1996 | Dwin et al. .......................... | 395/166 |
| 5,544,320 | 8/1996 | Konrad ............................. | 395/200.09 |
| 5,673,322 | 9/1997 | Pepe et al. ............................. | 380/49 |
| 5,684,969 | 11/1997 | Ishida .................................. | 395/342 |
| 5,701,451 | 12/1997 | Rogers et al. ....................... | 395/600 |
| 5,706,434 | 1/1998 | Kremen et al. ................. | 395/200.09 |
| 5,724,556 | 3/1998 | Souder et al. ...................... | 395/500 |
| 5,727,159 | 3/1998 | Kikinis ........................... | 395/200.76 |
| 5,742,905 | 4/1998 | Pepe et al. ........................... | 455/461 |
| 5,768,510 | 6/1998 | Gish .............................. | 395/200.33 |
| 5,805,735 | 9/1998 | Chen et al. ......................... | 382/239 |
| 5,867,494 | * 2/1999 | Krishnaswamy et al. .......... | 370/352 |
| 5,996,022 | * 11/1999 | Krueger et al. ..................... | 709/247 |
| 6,073,168 | * 6/2000 | Mighdoll et al. .................... | 709/217 |

OTHER PUBLICATIONS

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

* cited by examiner

*Primary Examiner*—Ajit Patel
(74) *Attorney, Agent, or Firm*—Kenyon & Kenyon

(57) ABSTRACT

A method for determining effective link speed for communications from a first device to a second device coupled by a communications link includes the steps of transmitting a packet from the first device to the second device; receiving a responsive packet at the first device; and determining an effective link speed for communications between the first device and the second device using a period of time between the transmission and receipt.

22 Claims, 3 Drawing Sheets

SYSTEM FOR DYNAMICALLY DETERMINING EFFECTIVE SPEED OF A COMMUNICATION LINK

This application claims the benefit of U.S. Provisional Application Ser. No. 60/042,073, filed Mar. 25, 1997.

BACKGROUND OF THE INVENTION

1. Field of the Invention

The present invention relates generally to the field of computer networking, and in particular to a system for dynamically determining the effective speed of a communications link between two network devices.

2. Related Art

Existing devices used to communicate information over a computer network, such as the Internet, typically have limited capability for determining the effective speed of the communications links they use, and therefore little capability to adapt their behavior to such link speed. For example, a device that is sending a packet to another device over a communications link comprising multiple "legs," the sending device may have access to data relating to the raw bandwidth of the first leg of the communications link to that other device, but no data relating to the effective or usable bandwidth of the other legs. Existing devices typically rely on the Transmission Control Protocol (TCP) to deliver their packets regardless of the condition of the transmission medium being used. Thus, users desiring to download information from a Web site, for example, are often required to specifically select whether to download content that is either formatted for a relatively fast connection (usually higher quality or higher resolution) or a relatively slow connection (usually lower quality or lower resolution), and must make this selection without having up-to-date information about the effective speed of the link that will be used for the download.

Knowing the effective speed of an entire communications link between two devices, or even a reasonable approximation of the effective speed, can be highly useful. For instance, a device with such knowledge may dynamically alter its behavior to make better use of the communications link, such as by scaling or compressing content prior to transmitting the content to a peer device on the other end of an unusually slow communications link. Effective link speed information may also be used, for example, to adapt the quality of H.263 video transmissions, or to dynamically select among several communications links coupled to a multi-homed device, such as a notebook computer having access to both cellular data dial-up and narrow-band socket connections.

Accordingly, there is a need for a method of dynamically determining the effective speed of a communications link between two network devices. Moreover, there is a need for a method of determining the effective speed of communications links between network devices without requiring changes to existing network infrastructure. In other words, to the maximum extent possible, the method should be transparent to, or at least compatible with, the existing communications capabilities of standard network devices.

SUMMARY OF THE INVENTION

The present invention relates to systems, methods and apparatus for determining effective link speed for communications between network devices. Embodiments of the invention may be used, for example, to determine the effective link speed between a client device and another device, such as a network proxy or a transcoding server, through which the client device accesses content on the Internet.

According to one particular embodiment of the present invention, a method for determining effective link speed for communications from a first device to a second device coupled by a communications link includes the steps of transmitting a packet from the first device to the second device; receiving a responsive packet at the first device; and determining an effective link speed for communications between the first device and the second device using a period of time between the transmission and the receipt.

DETAILED DESCRIPTION

Embodiments of the present invention provide the ability to determine a measure of effective link speed for communications between network devices. Such embodiments may be used, for example, to support transcoding services provided by a network device through which one or more client devices access content resident on a network such as the Internet.

Figure 1:
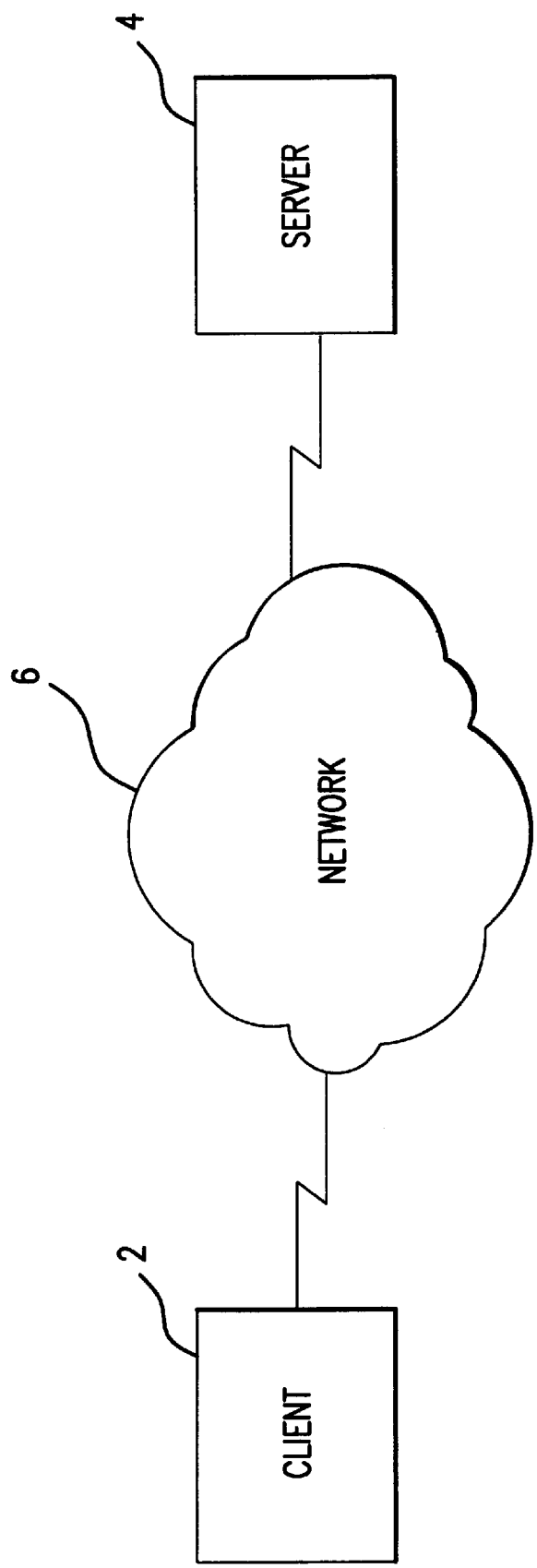
FIG. 1 is a schematic diagram illustrating an environment in which an embodiment of the present invention may be implemented.

Referring now to FIG. 1, which illustrates an environment in which embodiments of the present invention may be advantageously applied, a first device 2 is configured to transmit data to a second device 4. First device 2 communicates with second device 4 through a network 6. Network 6 may comprise, for example, the Internet. In one common arrangement, first device 2 may comprise a network client device and second device 4 may comprise a network server device. In such an arrangement, the connection between the respective devices would typically comprise a series of communications links. In another common arrangement, first device 2 may be configured to always communicate with external network devices, such as second device 4, through a network proxy (not shown). Proxy arrangements of this type are well known in the art. It should be noted, however, that the present invention is not dependent upon any particular type of network device, nor upon any particular communications medium or combination of media between the subject network devices.

Figure 2:
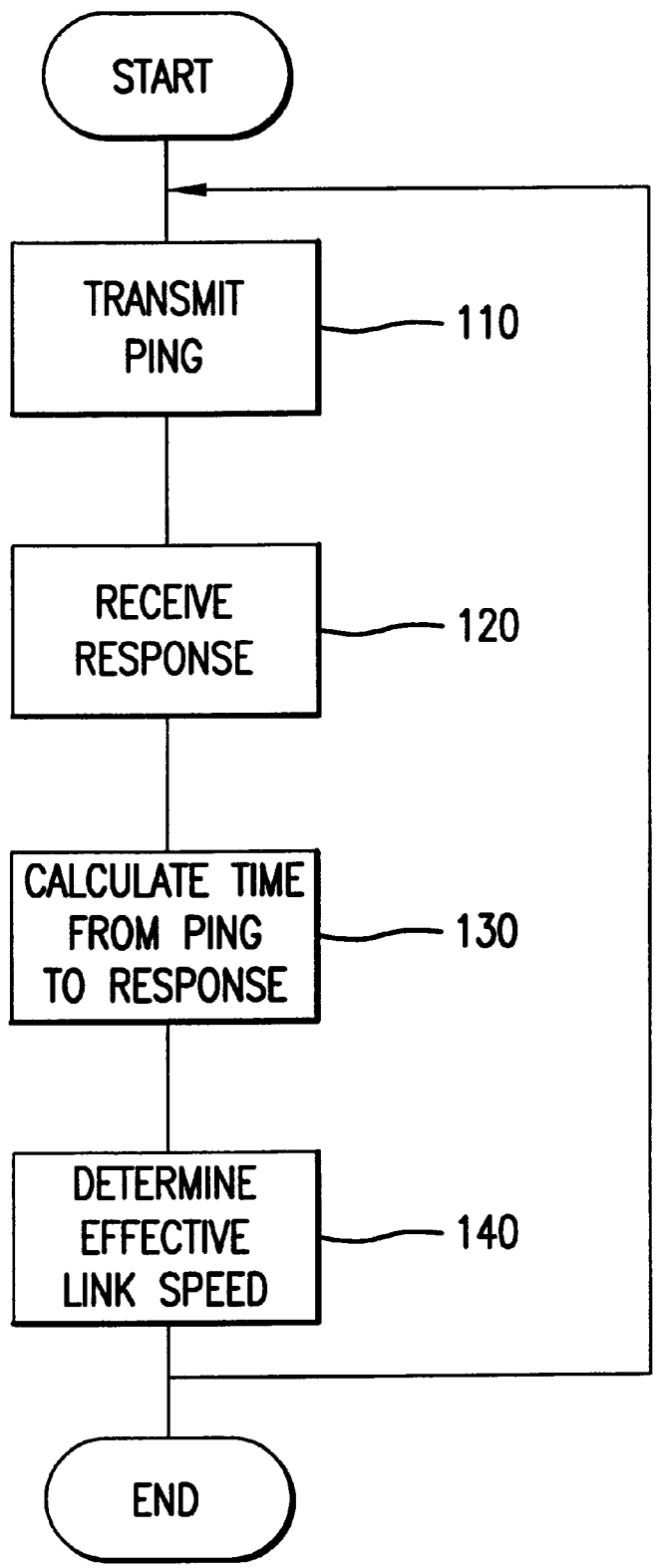
FIG. 2 is a flow diagram illustrating a method for determining effective link speed according to an embodiment of the present invention.

According to a first embodiment of the present invention, illustrated in the flow chart of FIG. 2, a method for dynamically determining effective link speed for communications between first device 2 and second device 4 (see FIG. 1) involves first device 2 transmitting one or more "pings" to second device 4. Such pings may comprise, for example, ICMP (Internet Control Message Protocol) echo requests. The ICMP echo technique is described in Douglas E. Comer, *Internetworking with TCP/IP* 127 (3d ed., Prentice-Hall 1995). As is known in the art, when second device 4 receives one of these pings, it will immediately transmit a responsive ping back to first device 2. First device 2, having knowledge of the number and size of the packets transmitted to second device 4, can then track the times between transmission of a ping(s) and receipt of a responsive ping(s), and then use this information to derive an approximation of the effective link speed. Increasing the number of pings sent will generally result in a more accurate determination of effective link speed.

Looking more closely at the embodiment illustrated in FIG. 2, processing begins with the source device transmitting a ping, such as an ICMP echo request, to the destination device (Step 110). The source device may record the system time at which the ping is sent. As noted above, the ping is of such a nature that the destination device receiving the ping will transmit a responsive ping back to the source device. Upon receipt of the responsive ping (Step 120), the source device may compare the current system time to the previously-recorded system time to determine the period of time which passed between transmission of the original ping and receipt of the responsive ping (Step 130). The source device may then use this time period to derive a measure of effective link speed for communications between the source device and the destination device (Step 140).

For some purposes, the use of a data object larger than an ICMP echo request as the original ping may permit a more accurate determination of effective link speed. Referring again to FIG. 1, this may be especially true where first device 2 and second device 4 communicate over a reliable communications link. Accordingly, in addition to echo requests, first device 2 may optionally transmit a predetermined quantity of data, such as a data object of known size, to second device 4. By marking the beginning time and ending time for the transmission, for example, first device 2 may derive a measure of effective link speed in terms of a quantity of data transmitted per unit of time. First device 2 may also maintain running totals and/or rolling averages for the information derived in this manner. Such historical information may be used, for example, to reject subsequently obtained measurements that fall outside of an established "normal" range.

To ensure an accurate measurement of effective link speed is obtained, it may sometimes be desirable for first device 2 to ping second device 4 only when the communications link between them is idle. Of course, since first device 2 and second device 4 will rarely be coupled by a dedicated communications link, first device 2 may be limited to measuring effective link speed when its own communications port is not busy. This may be accomplished, for example, by implementing the measurement functionality as a "sleeping thread" configured to be invoked automatically when the communications port of first device 2 is idle. The use of threads in this manner is well known in the art.

For most purposes, it will generally be sufficient to derive a fairly broad approximation of effective link speed, in effect simply making a high-level distinction between a "fast" link and a "slow" link. For example, a "fast" link may be broadly defined as one with an effective link speed on the order of 5× or 10× the effective link speed of a designated "slow" link. For other purposes, however, it may be desirable to arrive at a more detailed measure of effective link speed. This may be done, for example, by increasing not only the number of pings used to measure link speed, but also increasing the frequency at which the link speed is periodically rechecked. In this way, devices using the derived link speed measurement are able to be responsive to ever-changing conditions of the communications links they use.

Similarly, it may sometimes be useful to distinguish between a measurement of latency and a measurement of effective usable bandwidth for communications between first device 2 and second device 4. Effective usable bandwidth may generally be viewed as a measure of the rate at which data may be put onto the communications link between first device 2 and second device 4; whereas latency may generally be viewed as an inherent delay between the transmission of data from first device 2 and receipt of that data at second device 4. Latency is generally governed by link speed (although intermediate link congestion is also a factor), and may be sufficiently determined using as few as one ICMP echo request. Effective usable bandwidth, on the other hand, is governed by both link speed and the quantity of data being sent. Where the purpose of measuring effective link speed is to control a transmission of non-realtime data, such as purely textual or static graphical information, a measure of effective usable bandwidth is generally sufficient. Where, however, the purpose is to control a transmission of realtime data, such as live-action video, it is generally desirable to analyze both latency and effective usable bandwidth.

For embodiments using echo requests and/or some predetermined quantity of data, it is generally desirable to reject measurements which fall outside of some predetermined "normal" range. Such an approach avoids unduly skewing measurements as a result of one-time or otherwise anomalous conditions.

In one possible variation on the above-described embodiment, an assumption is made that the communications leg closest to first device 2 will always be the slowest leg in the link to second device 4, and therefore only the effective speed of that first leg need be evaluated to derive a useful approximation of the overall effective link speed. This assumption is generally a reasonable one, since the latter legs of the communications link between first device 2 and second device 4 would typically reside on the Internet backbone, which exhibits transmission speeds far in excess of those possible with most common methods of providing a client device, for example, with Internet connectivity. In one embodiment of this variation, the method used by a UNIX utility known as "TRACEROUTE" may be used to identify a TCP/IP address for the closest host device in the communications link between first device 2 and second device 4. First device 2 may then ping that closest host device as described above.

Since the ICMP echo requests used in the above-described embodiments are understood by virtually all devices which communicate over the Internet, the foregoing embodiments can be used in a manner that is essentially transparent to both the destination device being pinged and any intermediate devices arranged between the source device and the destination address.

Figure 3:
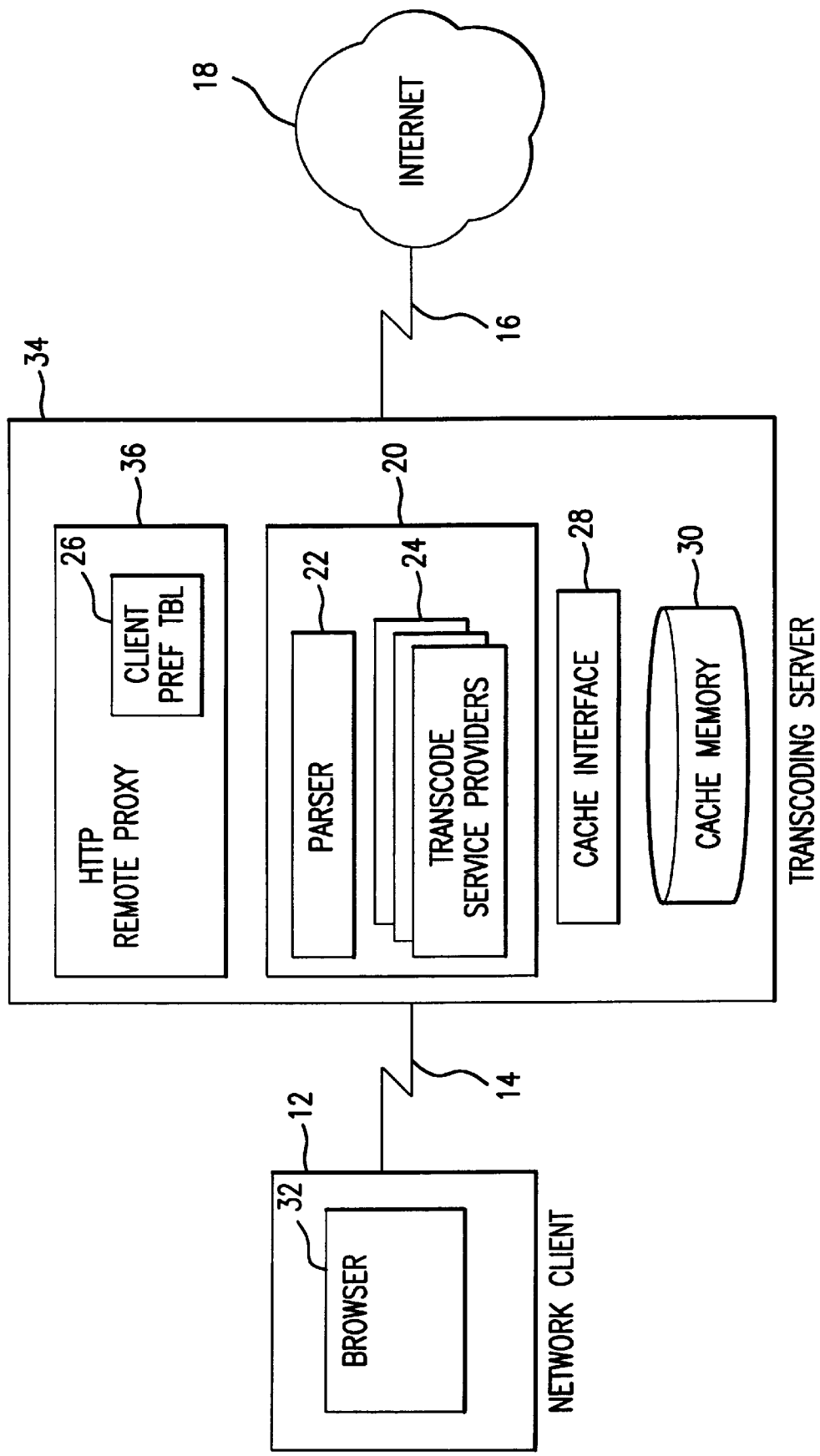
FIG. 3 is a schematic diagram illustrating a network device in which a method for determining effective link speed according to an embodiment of the present invention may be implemented.

A measurement of effective link speed according to the embodiments described above can be used for any number of useful purposes, including enabling a dynamic determination of whether data should be scaled or otherwise transcoded prior to transmitting it from one device, such as a network proxy, to another device, such as a client computer. By way of further illustration, in accordance with another embodiment of the present invention illustrated schematically in FIG. 3, a method for determining effective link speed such as that described above may be implemented in a network server 10 configured to manage the transfer of data from the Internet 18 to a network client 12.

In this embodiment, network client 12 may be any computer having suitable data communications capability. Network client 12 communicates requests for information to, and receives information from, network server 10 over a client/server communications link 14. Client/server communications link 14 may comprise, for example, a so-called "slow network" using, for example, POTS (Plain Old Telephone System) dial-up technology or wireless connections. Alternatively, client/server communications link 14 may comprise a so-called "fast network," such as a LAN or WAN (Wide Area Network), which is capable of operating at much higher speeds than are possible with slow networks. Combinations of these access methods are also possible. For example, network client 12 may use a POTS or wireless dial-up connection to a modem bank maintained by an ISP (Internet Service Provider), which is in turn connected to network server 10 over a LAN. Network server 10 communicates with computers resident on Internet 18 through server/network communications link 16, which may comprise any suitable communications medium known in the art.

In this particular embodiment, network server 10 includes a transcoder 20 having a parser 22 and a plurality of transcode service providers 24. Parser 22 is configured to act upon data received by transcoder 20, such as a request for a network object generated by network client 12 or a reply to such a request provided by a content server device. In this particular embodiment, parser 22 is responsible for selectively invoking one or more of transcode service providers 24 based upon a predetermined selection criterion. In this context, the term "transcode" contemplates virtually any manipulation of data, including adding, changing and deleting data.

Transcoding server 34 also includes an HTTP (HyperText Transfer Protocol) remote proxy 36, capable of accessing Internet 18 over server/network communications link 16. HTTP remote proxy 36 differs from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from Internet 18 prior to returning it to a requesting network client 12.

Parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the ability to compress and/or scale different types of data content, such as image, video, or HTML (HyperText Markup Language). In such a case, the selection criterion (or one of a plurality of selection criteria) may be the effective link speed of client/server communications link 14. Thus, parser 22 may be configured to first determine the effective link speed and then selectively invoke transcode service provider 24 based upon the results of that determination. For example, where the determination of effective link speed indicates client/server communications link 14 is relatively slow, parser 22 may invoke a particular transcode service provider 24 to compress the requested data prior to transmission to network client 12. In this way, embodiments of the present invention may be used to increase the responsiveness of transcoding server 34 to the ever-changing conditions of client/server communications link 14.

Although the present invention has been described with reference to embodiments for communications over the Internet, persons skilled in the art will recognize that it is equally applicable to other networking environments. For example, embodiments of the present invention may be used to enhance data communications between a network client computer and an "intranet." An intranet typically is a secure corporate network modeled after the Internet architecture, and generally includes mechanisms for communicating with external networks such as the Internet.

The foregoing is a detailed description of particular embodiments of the present invention. The invention embraces all alternatives, modifications and variations that fall within the letter and spirit of the claims, as well as all equivalents of the claimed subject matter. For example, embodiments of the present invention may employ transmission of data packets other than ICMP echo requests. Persons skilled in the art will recognize from the foregoing detailed description that many other alternatives, modifications and variations are possible.

What is claimed is:

1. A method for enhancing data communications from a first device to a second device coupled by a communications link, said method comprising the steps of:

receiving at a first device a request to transmit a data object to a second device;

transmitting a test packet from the first device to the second device in response to receiving said request;

receiving a responsive test packet at the first device;

determining an effective link speed for communications between the first device and the second device using a period of time between said transmission and said receipt of test packets;

transcoding the requested data object to optimize its transmission to the second device based upon the effective link speed; and transmitting the transcoded data object to the second device.

2. The method of claim 1, further comprising the step of storing the determined effective link speed.

3. The method of claim 2, further comprising the steps of:

repeating said steps of transmitting a test packet, receiving a responsive test packet, and determining an effective link speed to determine a current effective link speed; and updating said stored effective link speed based upon the current effective link speed.

4. The method of claim 3, wherein said stored effective link speed is updated periodically.

5. The method of claim 1, wherein the transmitted test packet has a predetermined size, said effective link speed comprising a measurement of a quantity of data transmitted per unit of time.

6. The method of claim 1, wherein the first device comprises a network client and the second device comprises an intermediate device for routing a communication from the network client to a predetermined network server, said method further comprising the step of determining a network address associated with the second device.

7. The method of claim 6, wherein the first device comprises a network client capable of selectively communicating with a network server through any of a plurality of intermediate routing devices, said method further comprising the steps of:

determining an effective link speed between the first device and each of the plurality of intermediate routing devices; and selecting one of the plurality of intermediate routing devices for a communication from the network client to the network server according to said determined effective link speeds.

8. The method of claim 1, wherein said steps of transmitting a test packet, receiving a responsive test packet, and determining an effective link speed are repeated for a plurality of iterations, and said effective link speed comprises an average derived from said plurality of iterations.

9. The method of claim 8, further comprising the step of rejecting an iteration having a period of time outside of a predetermined range.

10. The method of claim 1, wherein said steps of transmitting a test packet, receiving a responsive test packet, and determining an effective link speed are performed upon demand by the first device upon detection of a predetermined condition of the communications link between the first device and the second device.

11. The method of claim 10, wherein said predetermined condition comprises an idle condition.

12. The method of claim 1, wherein said step of determining an effective link speed comprises measuring effective usable bandwidth between the first and second devices.

13. The method of claim 12, wherein said step of determining an effective link speed further comprises measuring latency between the first and second devices.

14. The method of claim 1, wherein said effective link speed comprises a measure of latency between the first and second devices.

15. A set of instructions for enhancing data communications with a network device over a communications link, the set of instructions being stored on a medium for execution by a computer and comprising instructions for:

receiving a request to transmit a data object to the network device;

transmitting a test packet to the network device over the communications link;

receiving a responsive test packet from the network device over the communications link;

determining an effective link speed from a time period between said transmission and said receipt of test packets;

transcoding the requested data object to optimize its transmission to the network device based upon the effective link speed; and transmitting the transcoded data object to the network device.

16. The set of instructions of claim 15, wherein said storage medium comprises a magnetic storage device.

17. The set of instructions of claim 15, wherein the storage medium comprises a memory installed in the computer.

18. The method of claim 1, wherein said transcoding comprises scaling the data object.

19. The method of claim 1, wherein said transcoding comprises compressing the data object.

20. The method of claim 1, wherein said transcoding comprises enhancing the data object.

21. The method of claim 1, wherein the first device and second device are capable of communicating over any of a plurality of communications links, said method further comprising determining an effective link speed for each of said plurality of communications links.

22. The method of claim 21, further comprising selecting a communications link having a fastest effective link speed for the data communication from the first device to the second device.

* * * * *